United States Patent
Wang

(10) Patent No.: US 10,832,647 B2
(45) Date of Patent: Nov. 10, 2020

(54) MOUSE DEVICE AND NOISE CANCELLATION METHOD OF THE SAME

(71) Applicant: Chicony Electronics Co., Ltd., New Taipei (TW)

(72) Inventor: Yi-Hung Wang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/510,974

(22) Filed: Jul. 14, 2019

(65) Prior Publication Data
US 2020/0320971 A1 Oct. 8, 2020

(30) Foreign Application Priority Data
Apr. 3, 2019 (TW) .................................. 108112014

(51) Int. Cl.
*H03B 29/00* (2006.01)
*G10K 11/178* (2006.01)
*G06F 3/0354* (2013.01)

(52) U.S. Cl.
CPC .... *G10K 11/17821* (2018.01); *G06F 3/03543* (2013.01); *G10K 2210/3044* (2013.01)

(58) Field of Classification Search
CPC ...................................................... H03B 29/00
See application file for complete search history.

(56) References Cited

U.S. PATENT DOCUMENTS

| | | | | |
|---|---|---|---|---|
| 5,621,612 A * | 4/1997 | Dahmen | ................... | G06F 1/18 312/223.2 |
| 6,232,994 B1 * | 5/2001 | Wiklof | ..................... | B41J 29/10 347/171 |
| 6,798,887 B1 * | 9/2004 | Andre | ..................... | G06F 21/83 381/1 |
| 6,933,925 B1 * | 8/2005 | Gibbons | ............. | G06F 3/03543 345/163 |
| 8,041,026 B1 * | 10/2011 | Coughlan | ........... | G10L 21/0208 379/392.01 |
| 8,053,688 B2 * | 11/2011 | Conzola | ................ | G06F 3/0219 200/5 A |
| 8,867,757 B1 * | 10/2014 | Ooi | ........................ | G06F 3/0219 381/122 |
| 10,002,602 B2 | 6/2018 | Wu et al. | | |
| 2006/0077178 A1 * | 4/2006 | Shin | .................... | G06F 3/03543 345/163 |

(Continued)

FOREIGN PATENT DOCUMENTS

TW 201731301 A 9/2017
TW M569884 U 11/2018

*Primary Examiner* — Olisa Anwah
(74) *Attorney, Agent, or Firm* — CKC & Partners Co., LLC

(57) ABSTRACT

A mouse device includes a button switch, a microcontroller, a speaker drive circuitry and a speaker. The button switch is configured to produce a first sound when being actuated. The microcontroller is electrically coupled to the button switch. The button switch is configured to provide an actuation signal to the microcontroller when being actuated. The speaker drive circuitry is electrically coupled to the microcontroller and the speaker is electrically coupled to the speaker drive circuitry. The speaker drive circuitry is configured to drive the speaker to play a second sound that substantially cancels out the first sound.

8 Claims, 4 Drawing Sheets

(56) References Cited

U.S. PATENT DOCUMENTS

| | | | |
|---|---|---|---|
| 2006/0082552 A1* | 4/2006 | Chen | G06F 3/03543 345/163 |
| 2006/0131155 A1* | 6/2006 | Hopkins | H01H 13/36 200/402 |
| 2006/0204015 A1* | 9/2006 | Ip | G10K 11/178 381/71.1 |
| 2006/0210105 A1* | 9/2006 | Liao | G06F 3/03543 381/334 |
| 2006/0274042 A1* | 12/2006 | Krah | G06F 3/03543 345/163 |
| 2006/0284844 A1* | 12/2006 | Yen | G06F 3/03543 345/163 |
| 2007/0035517 A1* | 2/2007 | Chen | G06F 3/03543 345/163 |
| 2008/0122791 A1* | 5/2008 | Hsu | G06F 3/03543 345/165 |
| 2009/0231279 A1* | 9/2009 | Ganey | G06F 3/03543 345/163 |
| 2010/0171702 A1* | 7/2010 | Cheng | G06F 3/03543 345/163 |
| 2010/0231516 A1* | 9/2010 | Maroun | G06F 3/03543 345/163 |
| 2012/0002820 A1* | 1/2012 | Leichter | G10L 21/0208 381/73.1 |
| 2013/0089219 A1* | 4/2013 | Allen | G10K 11/178 381/97 |
| 2014/0145954 A1* | 5/2014 | Wu | G06F 3/03543 345/163 |
| 2016/0379617 A1* | 12/2016 | Villaume | G10K 11/178 381/71.7 |
| 2017/0243574 A1 | 8/2017 | Wu et al. | |
| 2019/0098403 A1* | 3/2019 | Osterneck | H04R 3/007 |

* cited by examiner

MOUSE DEVICE AND NOISE CANCELLATION METHOD OF THE SAME

RELATED APPLICATIONS

This application claims priority to Taiwan Application Serial Number 108112014, filed Apr. 3, 2019, which is herein incorporated by reference in its entirety.

BACKGROUND

Technical Field

The present disclosure relates to a mouse device and a noise cancellation method of the mouse device.

Description of Related Art

A typical computer mouse produces an audible sound when its button is clicked. Therefore, using such computer mouse in a conference room, in public spaces or in a quiet environment may be annoying to others. A silent mouse has been created to resolve such an issue. Noise produced by a silent mouse is reduced by roughly eighty to ninety percent compared to a typical non-silent mouse.

Most of the commercially available silent mice reduce the clicking sound by replacing conventional microswitches with silent microswitches. However, such an approach comes with drawbacks such as the button having shorter lifespan and poor feedback, which remains to be resolved by technical person in related fields.

SUMMARY

In view of the foregoing, one of the objects of the present disclosure is to provide a new type of silent mouse that incorporates active noise cancellation (ANC) technology.

To achieve the objective stated above, in accordance with some embodiments of the present disclosure, a mouse device includes a button switch, a microcontroller, a speaker drive circuitry and a speaker. The button switch is configured to produce a first sound when being actuated. The microcontroller is electrically coupled to the button switch. The button switch is configured to provide an actuation signal to the microcontroller when being actuated. The speaker drive circuitry is electrically coupled to the microcontroller and the speaker is electrically coupled to the speaker drive circuitry. The speaker drive circuitry is configured to drive the speaker to play a second sound that substantially cancels out the first sound.

In one or more embodiments of the present disclosure, the microcontroller is configured to provide a notification signal when receiving the actuation signal, and the speaker drive circuitry is configured to drive the speaker to play the second sound after receiving the notification signal.

In one or more embodiments of the present disclosure, the mouse device further includes a memory unit electrically coupled to the microcontroller. The memory unit is configured to store an audio signal that is associated with the second sound.

In one or more embodiments of the present disclosure, the memory unit is integrated in the microcontroller.

In one or more embodiments of the present disclosure, the mouse device further includes an audio recording device, an audio recording device drive circuitry and a signal processing unit. The audio recording device drive circuitry is electrically coupled to the audio recording device and is configured to drive the audio recording device to record the first sound as a first audio signal. The signal processing unit is electrically coupled to the audio recording device drive circuitry and is configured to compute a second audio signal based on the first audio signal. The second audio signal is associated with the second sound.

In one or more embodiments of the present disclosure, the microcontroller is configured to provide a notification signal when receiving the actuation signal. The audio recording device drive circuitry is configured to drive the audio recording device to record the first sound when receiving the notification signal.

In one or more embodiments of the present disclosure, the mouse device further includes an active noise cancellation processor. The signal processing unit, the audio recording device drive circuitry and the speaker drive circuitry are integrated in the active noise cancellation processor.

In one or more embodiments of the present disclosure, the mouse device further includes a silent mode switch that is configured to switch the speaker drive circuitry on and off.

In accordance with some embodiments of the present disclosure, a noise cancellation method for a mouse device, the mouse device includes a button switch and a speaker. The button switch is configured to produce a first sound when being actuated. The noise cancellation method includes: instructing the speaker to play a second sound when the button switch is actuated, wherein the second sound substantially cancels out the first sound.

In one or more embodiments of the present disclosure, the mouse device further includes a microcontroller and a memory unit electrically coupled to the microcontroller. The noise cancellation method further includes: preloading an audio signal that is associated with the second sound into the memory unit; and instructing the microcontroller to read the audio signal from the memory unit when the button switch is actuated.

In one or more embodiments of the present disclosure, the mouse device further includes an audio recording device and an active noise cancellation processor electrically coupled to the audio recording device. The noise cancellation method further include: instructing the audio recording device to record the first sound as a first audio signal when the button switch is actuated; and instructing the active noise cancellation processor to compute a second audio signal based on the first audio signal, wherein the second audio signal is associated with the second sound.

In sum, the mouse device of the present disclosure adopts active noise cancellation technology to reduce clicking sound. The audio signal to be utilized to cancel out the clicking sound (i.e., the second audio signal mentioned above) may be computed and stored in advance, or alternatively be generated by performing audio recording and signal processing in real time.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
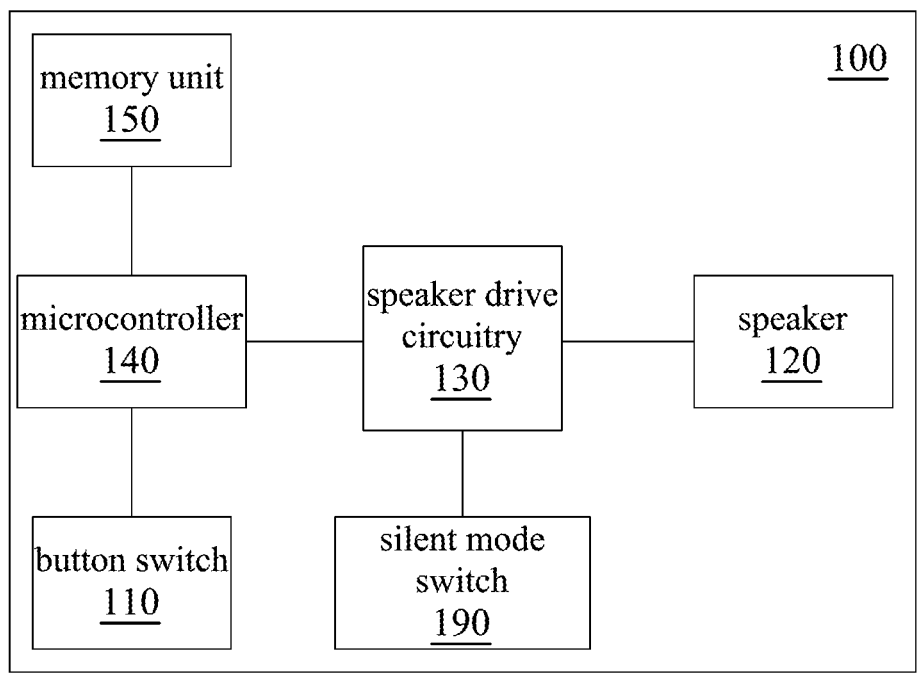
FIG. 1 illustrates a schematic block diagram of a mouse device in accordance with an embodiment of the present disclosure.

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Reference is made to FIG. 1, which illustrates a schematic block diagram of a mouse device 100 in accordance with an embodiment of the present disclosure. The mouse device 100 includes a button switch 110, a speaker 120, a speaker drive circuitry 130, a microcontroller 140 and a memory unit 150. The button switch 110 is positioned beneath a button (not shown) of the mouse device 100 and is configured to be actuated when said button is pressed. The button switch 110 is configured to produce a first sound S1 when being actuated. The microcontroller 140 is electrically coupled to the button switch 110 and is configured to detect if the button switch 110 has been actuated (e.g., the button switch 110 may provide the microcontroller 140 with an actuation signal ACS when being actuated; the relevant details will be described in detail below with reference to FIG. 3). In some embodiments, the button switch 110 is a microswitch.

Following the discussion in the previous paragraph, the speaker drive circuitry 130 is electrically coupled to the microcontroller 140 and the speaker 120. The speaker drive circuitry 130 is configured to drive the speaker 120 to play a second sound S2 that substantially cancels out the first sound S1 in response to the actuation of the button switch 110 (e.g., the microcontroller 140 may provide the speaker drive circuitry 130 with a notification signal NS when the microcontroller 140 receives the actuation signal ACS from the button switch 110; the relevant details will be described in detail below with reference to FIG. 3). Specifically, the second sound S2 played by the speaker 120 creates destructive interference to the first sound S1 produced by the button switch 110. Taking a sine wave as example, the second sound S2 may have the same amplitude as the first sound S1, but in antiphase (i.e., having 180 degree phase difference) with the first sound S1, thus capable of cancelling out the first sound S1. It is to be noted that the second sound S2 being capable of substantially cancelling out the first sound S1 as described does not mean the second sound S2 has to completely cancel out the first sound S1. In some embodiments, the second sound S2 serves to reduce the first sound S1 to an extent that is inaudible/hardly audible.

In some embodiments, the speaker 120 is disposed on a side of the button switch 110 and is preferably installed as close as possible to the button switch 110 to improve noise cancellation. The mouse device 100 may have a plurality of buttons (and corresponding button switches 110). In such embodiments, the mouse device 100 may include a plurality of speakers 120, each installed in proximity to the corresponding button switch 110. Alternatively, the mouse device 100 may include a single speaker 120. In some embodiments, the speaker 120 is a piezoelectric speaker. Piezoelectric speakers are compact in size and thus can be easily installed inside the mouse device 100, which in many cases has very limited internal space.

In the present embodiment, a second audio signal AS2 associated with the second sound S2 is stored in the memory unit 150. The memory unit 150 is electrically coupled to the microcontroller 140, and thus the microcontroller 140 is capable of reading the second audio signal AS2 from the memory unit 150 (e.g., when the microcontroller 140 receives the actuation signal ACS) and transmitting the second audio signal AS2 to the speaker drive circuitry 130. In some embodiments, the second audio signal AS2 is a digital signal and the speaker drive circuitry 130 is capable of performing digital-to-analog conversion. The speaker drive circuitry 130 converts the second audio signal AS2 to an analog signal and subsequently drive the speaker 120 to play the second sound S2 based on said analog signal.

In the present embodiment, the second audio signal AS2 is preloaded into the memory unit 150 when the mouse device 100 is manufactured. For instance, the first sound S1 may be recorded as a first audio signal AS1 in advance in a quiet environment such as a lab. The second audio signal AS2 is computed based on the first audio signal AS1 using appropriate signal processing algorithm(s) and is subsequently written to the memory unit 150.

The memory unit 150 may be SRAM, DRAM, ROM, EPROM, EEPROM, NAND flash or any other suitable computer-readable memory device or storage device. The button switch 110 may not be identical (different models/types of switches) across all models of mouse device 100. In view of this, in some embodiments, the memory unit 150 is configured to store a plurality of audio signals that may be utilized to cancel out the sounds produced by different button switches 110 used in different models of mouse device 100 respectively. Therefore, the memory unit 150 may be applicable to different models of mouse device 100, and producing different memory units 150 for different models of mouse device 100 is not required.

In some embodiments, the mouse device 100 further includes a silent mode switch 190. The silent mode switch 190 is electrically coupled to the speaker drive circuitry 130 and is configured to switch the speaker drive circuitry 130 on and off. Specifically, the silent mode switch 190 is configured to provide a turn-on signal to the speaker drive circuitry 130 to switch the speaker drive circuitry 130 on when the silent mode switch 190 is switched on. On the other hand, the silent mode switch 190 is configured to provide a turn-off signal to the speaker drive circuitry 130 to switch the speaker drive circuitry 130 off when the silent mode switch 190 is switched off. The user may choose whether or not to activate the silent mode by toggling the silent mode switch 190.

In some embodiments, the silent mode switch 190 is electrically coupled to the microcontroller 140. The silent mode switch 190 is configured to provide a turn-on signal to the microcontroller 140 when the silent mode switch 190 is switched on. When the microcontroller 140 receives the turn-on signal, the microcontroller 140 reads the second audio signal AS2 from the memory unit 150 upon reception of the actuation signal ACS and transmits the second audio signal AS2 to the speaker drive circuitry 130. On the other hand, the silent mode switch 190 is configured to provide a turn-off signal to the microcontroller 140 when the silent mode switch 190 is switched off. When the microcontroller 140 receives the turn-off signal, the microcontroller 140 does not perform the read of the second audio signal AS2 upon reception of the actuation signal ACS.

Figure 2:
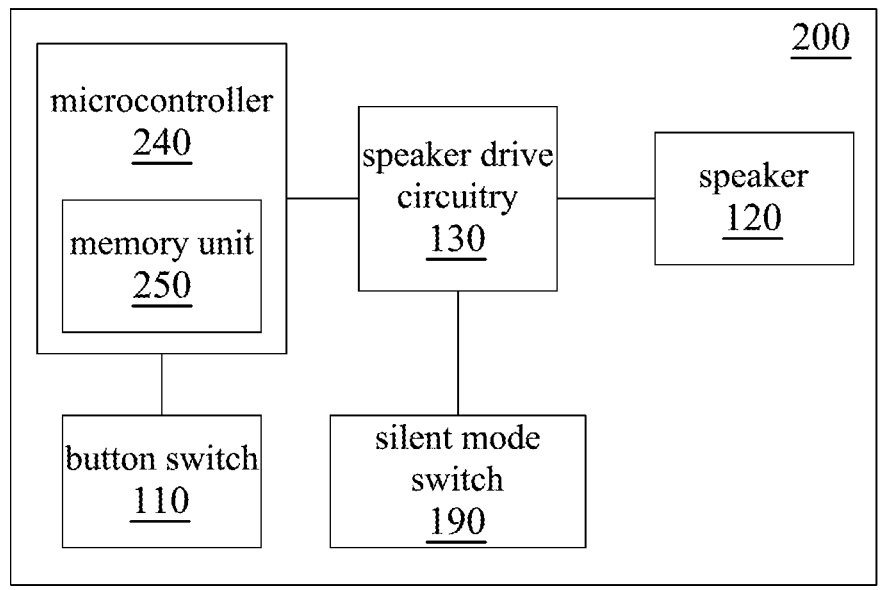
FIG. 2 illustrates a schematic block diagram of a mouse device in accordance with another embodiment of the present disclosure.

Reference is made to FIG. 2, which illustrates a schematic block diagram of a mouse device 200 in accordance with another embodiment of the present disclosure. The mouse device 200 includes a button switch 110, a speaker 120, a speaker drive circuitry 130, a microcontroller 240, a memory unit 250 and a silent mode switch 190. Like reference numerals refer to like elements that are substantially identical to those previously described with reference to FIG. 1. Descriptions regarding these elements are not repeated herein for brevity.

Unlike the embodiment shown in FIG. 1, in which the memory unit 150 is external to the microcontroller 140, in the present embodiment, the memory unit 250 of the mouse device 200 is integrated in the microcontroller 240. In other words, the second audio signal AS2 is preloaded into a memory built into the microcontroller 240, thus eliminating the need for an external storage member connected the microcontroller 240.

Figure 3:
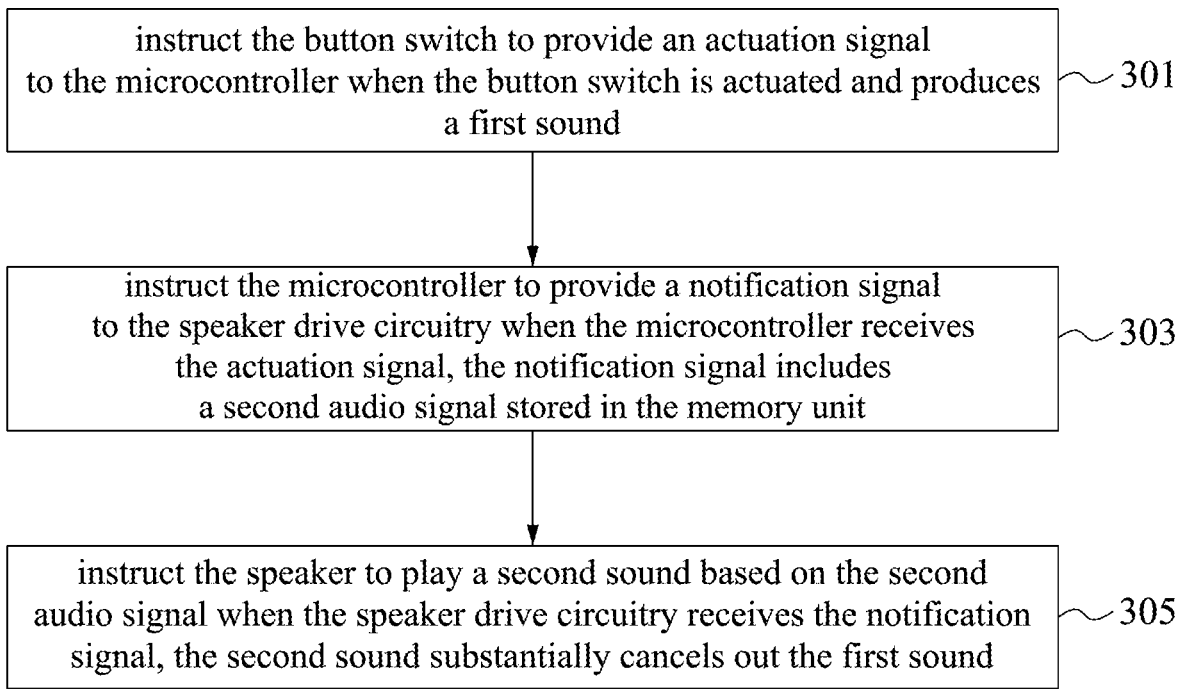
FIG. 3 illustrates a flowchart of a noise cancellation method for the mouse device shown in FIG. 1.

Reference is made to FIG. 3, which illustrates a flowchart of a noise cancellation method 300 for the mouse device 100 shown in FIG. 1. It is to be noted that the word "noise" refers to the first sound S1 produced by the button switch 110. First, in step 301, instruct the button switch 110 to provide an actuation signal ACS to the microcontroller 140 when the button switch 110 is actuated (e.g., when a button associated with the button switch 110 is pressed) and produces a first sound S1.

Next, in step 303, instruct the microcontroller 140 to read a second audio signal AS2 from the memory unit 150 and to provide a notification signal NS to the speaker drive circuitry 130 when the microcontroller 140 receives the actuation signal ACS. The notification signal NS includes the second audio signal AS2.

Last, in step 305, instruct the speaker 120 to play a second sound S2 based on the second audio signal AS2 when the speaker drive circuitry 130 receives the notification signal NS. The second sound S2 substantially cancels out the first sound S1.

In some embodiments, the second audio signal AS2 is a digital signal. The speaker drive circuitry 130 is configured to convert the second audio signal AS2 to an analog signal and subsequently drive the speaker 120 to play the second sound S2 based on said analog signal.

The noise cancellation method 300 is also applicable to the mouse device 200 shown in FIG. 2. The difference is that the microcontroller 240 of the mouse device 200 reads the second audio signal AS2 from the memory unit 250 integrated therein, whereas the microcontroller 140 of the mouse device 100 reads the second audio signal AS2 from the memory unit 150 external to the microcontroller 140.

Figure 4:
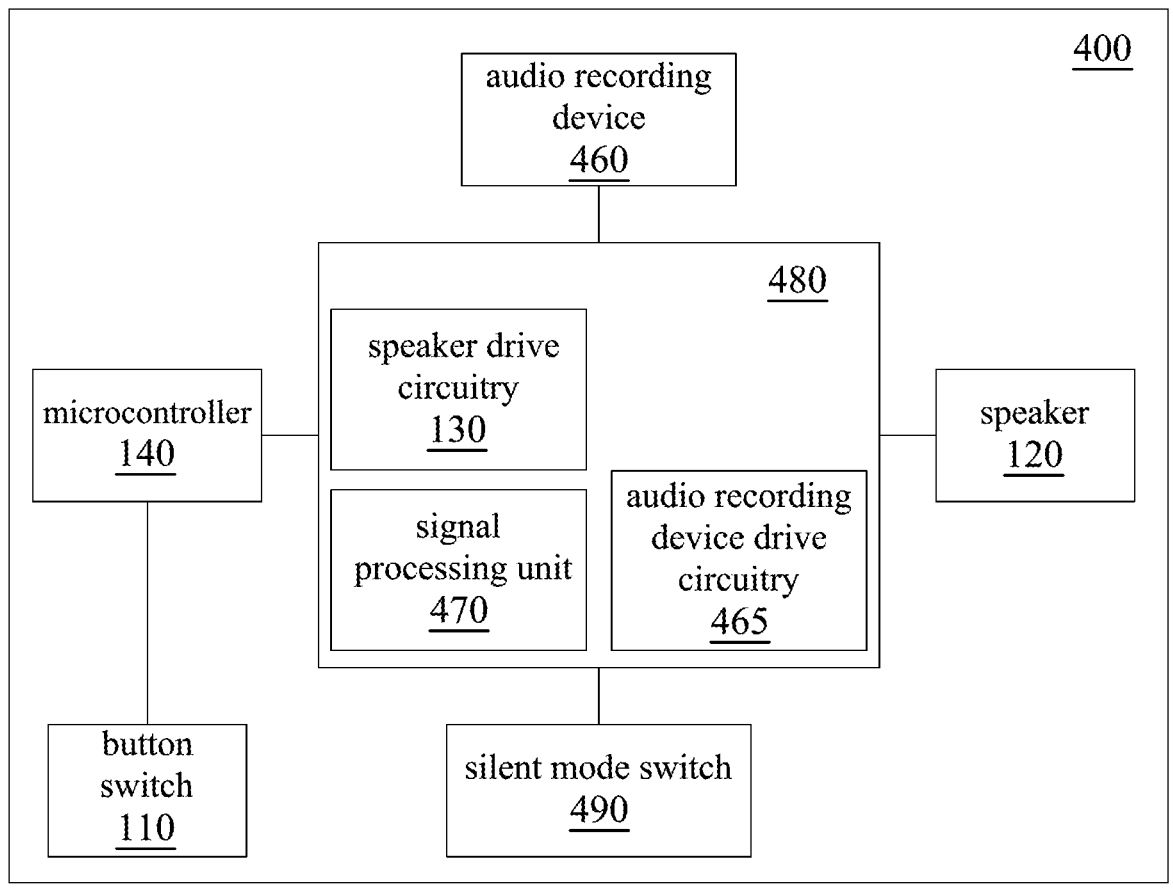
FIG. 4 illustrates a schematic block diagram of a mouse device in accordance with another embodiment of the present disclosure.

Reference is made to FIG. 4, which illustrates a schematic block diagram of a mouse device 400 in accordance with another embodiment of the present disclosure. The mouse device 400 includes a button switch 110, a speaker 120, a speaker drive circuitry 130, a microcontroller 140, an audio recording device 460, an audio recording device drive circuitry 465 and a signal processing unit 470. Like reference numerals refer to like elements that are substantially identical to those previously described with reference to FIG. 1. Descriptions regarding these elements are not repeated herein for brevity. Unlike the embodiment shown in FIG. 1, in which the second audio signal AS2 is computed and stored in advance, the mouse device 400 of the present embodiment generates the second audio signal AS2 in real time.

In the present embodiment, the audio recording device 460 is disposed on a side of the button switch 110. The audio recording device drive circuitry 465 is electrically coupled to the audio recording device 460 and is configured to drive the audio recording device 460 to record the first sound S1 as a first audio signal AS1. The audio recording device 460 is oriented towards the button switch 110 and is preferably installed as close as possible to the button switch 110 to improve audio quality. In some embodiments, the audio recording device 460 is a MEMS microphone. MEMS microphones are compact in size and thus can be easily installed inside the mouse device 400, which in many cases has very limited internal space. The signal processing unit 470 is electrically coupled to the audio recording device drive circuitry 465 and is configured to compute the second audio signal AS2 based on the first audio signal AS1 recorded by the audio recording device 460.

In the present embodiment, the signal processing unit 470, the audio recording device drive circuitry 465 and the speaker drive circuitry 130 are integrated in an active noise cancellation processor 480 (ANC processor). In other words, the active noise cancellation processor 480 is capable of performing signal processing and driving the audio recording device 460 and the speaker 120. The active noise cancellation processor 480 is electrically coupled to the microcontroller 140 and the audio recording device 460. The active noise cancellation processor 480 is configured to drive the audio recording device 460 to record the first sound S1 as the first audio signal AS1 in response to actuation of the button switch 110 (e.g., in response to reception of the notification signal NS delivered from the microcontroller 140). Thereafter, the active noise cancellation processor 480 computes the second audio signal AS2 based on the first audio signal AS1 and drives the speaker 120 to play the second sound S2 to cancel out the first sound S1.

The signal processing unit 470 may be an analog signal processing unit or a digital signal processing unit. In cases where the signal processing unit 470 is a digital signal processing unit, the active noise cancellation processor 480 first converts the first audio signal AS1 recorded by the audio recording device 460 to a digital signal and input said digital signal to the signal processing unit 470 for processing. Based on said digital signal, the signal processing unit 470 computes the second audio signal AS2 which is in digital format. Subsequently, the active noise cancellation processor 480 converts the second audio signal AS2 to an analog signal and drives the speaker 120 to play the second sound S2 based on said analog signal.

The mouse device 400 may include multiple audio recording devices 460 (e.g., a microphone array) to record the first sound S1 produced by the button switch 110 from different angles and locations. In such embodiments, as compared to the configuration with a single audio recording device 460, a more complex signal processing algorithm is required to compute the second audio signal AS2 based on multiple first audio signals AS1 recorded by the audio recording devices 460. Signal processing algorithm is not the main focus of the present disclosure and thus will not be discussed in detail herein. People with ordinary skill in relevant art may select appropriate algorithm(s) to construct the second signal AS2 from the first signal(s) AS1.

The mouse device 400 may have a plurality of buttons (and corresponding button switches 110). In such embodiments, the mouse device 400 may include a plurality of audio recording devices 460, each installed in proximity to the corresponding button switch 110 to record the sound produced the corresponding button switch 110. Alternatively, sounds produced by the button switches 110 may be recorded with a single audio recording device 460.

In some embodiments, the mouse device 400 further includes a silent mode switch 490. The silent mode switch 490 is electrically coupled to the active noise cancellation processor 480 and is configured to switch the active noise cancellation processor 480 on and off. Specifically, the silent mode switch 490 is configured to provide a turn-on signal to the active noise cancellation processor 480 to switch the active noise cancellation processor 480 on when the silent mode switch 490 is switched on. On the other hand, the silent mode switch 490 is configured to provide a turn-off signal to the active noise cancellation processor 480 to switch the active noise cancellation processor 480 off when the silent mode switch 490 is switched off.

Figure 5:
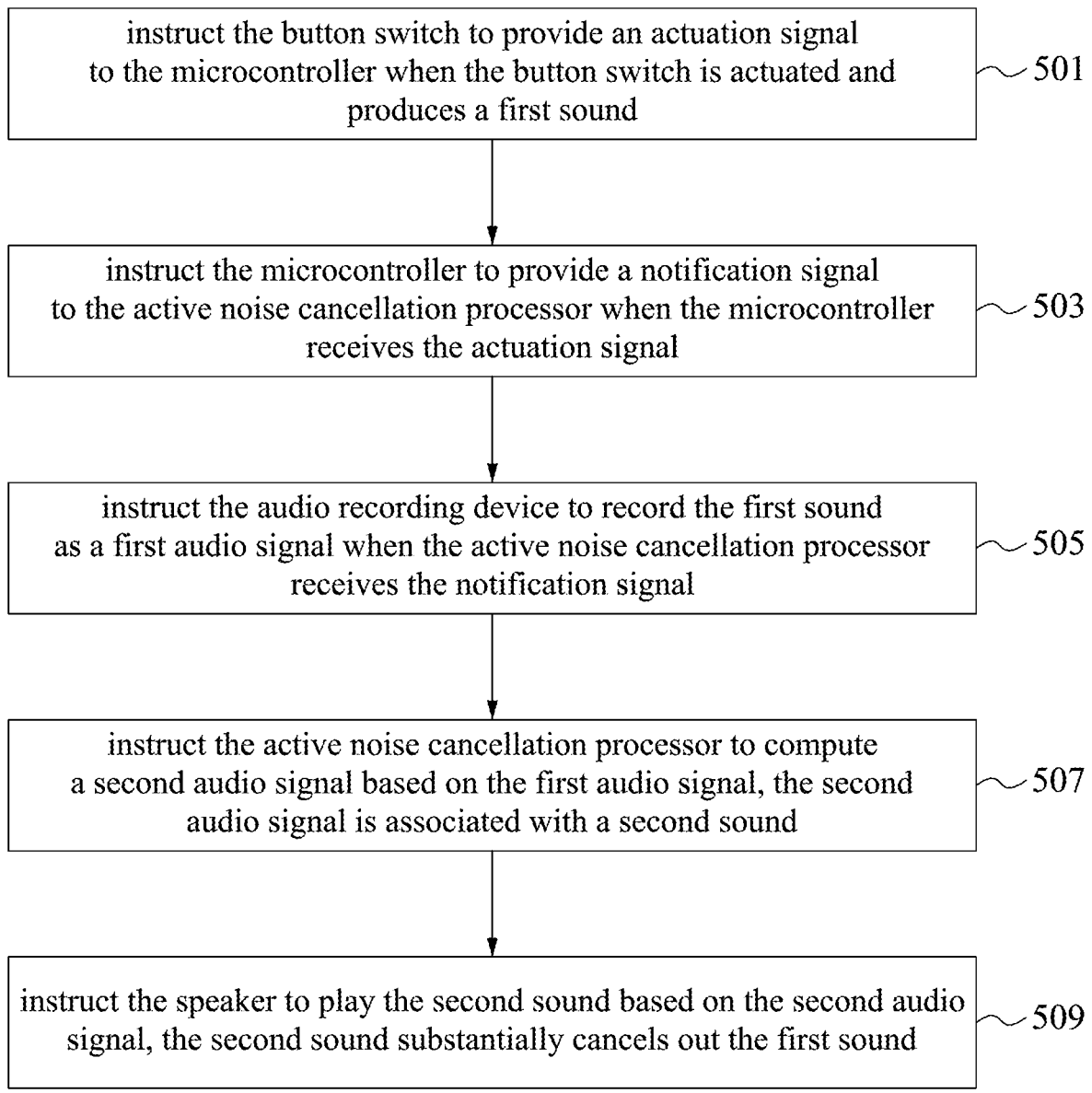
FIG. 5 illustrates a flowchart of a noise cancellation method for the mouse device shown in FIG. 4.

Reference is made to FIG. 5, which illustrates a flowchart of a noise cancellation method 500 for the mouse device 400 shown in FIG. 4. First, in step 501, instruct the button switch 110 to provide an actuation signal ACS to the microcontroller 140 when the button switch 110 is actuated (e.g., when a button associated with the button switch 110 is pressed) and produces a first sound S1.

Next, in step 503, instruct the microcontroller 140 to provide a notification signal NS to the active noise cancellation processor 480 when the microcontroller 140 receives the actuation signal ACS.

Next, in step 505, instruct the audio recording device 460 (e.g., drive the audio recording device 460 with the audio recording device drive circuitry 465 in the active noise cancellation processor 480) to record the first sound S1 as a first audio signal AS1 when the active noise cancellation processor 480 receives the notification signal NS. In some embodiments, the audio recording device 460 is only turned on after the notification signal NS is received and is turned off to save power for the rest of the time.

Next, in step 507, after the audio recording device 460 completes the recording of the first audio signal AS1, instruct the active noise cancellation processor 480 to compute a second audio signal AS2 based on the first audio signal AS1 (e.g., the computation is performed by the signal processing unit 470 of the active noise cancellation processor 480). The second audio signal AS2 is associated with a second sound S2.

Last, in step 509, after the second audio signal AS2 is computed, instruct the speaker 120 (e.g., with the speaker drive circuitry 130 of the active noise cancellation processor 480) to play the second sound S2 based on the second audio signal AS2. The second sound S2 substantially cancels out the first sound S1.

In sum, the mouse device of the present disclosure adopts active noise cancellation technology to reduce clicking sound. The audio signal to be utilized to cancel out the clicking sound (i.e., the second audio signal mentioned above) may be computed and stored in advance, or alternatively be generated by performing audio recording and signal processing in real time.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A mouse device, comprising:
    a button switch configured to produce a first sound when being actuated;
    a microcontroller electrically coupled to the button switch, wherein the button switch is configured to provide an actuation signal to the microcontroller when being actuated;
    a speaker drive circuitry electrically coupled to the microcontroller;
    a speaker electrically coupled to the speaker drive circuitry, wherein the speaker drive circuitry is configured to drive the speaker to play a second sound that substantially cancels out the first sound;
    an audio recording device configured to record the first sound as a first audio signal in response to the microcontroller receiving the actuation signal from the button switch; and
    a signal processing unit configured to compute a second audio signal based on the first audio signal, wherein the second audio signal is associated with the second sound.

2. The mouse device of claim 1, wherein the microcontroller is configured to provide a notification signal when receiving the actuation signal, and the speaker drive circuitry is configured to drive the speaker to play the second sound after receiving the notification signal.

3. The mouse device of claim 1, further comprising:
    an audio recording device drive circuitry electrically coupled to the audio recording device and configured to drive the audio recording device to record the first sound.

4. The mouse device of claim 3, wherein the microcontroller is configured to provide a notification signal when receiving the actuation signal, and the audio recording device drive circuitry is configured to drive the audio recording device to record the first sound when receiving the notification signal.

5. The mouse device of claim 3, further comprising an active noise cancellation processor, wherein the signal processing unit, the audio recording device drive circuitry and the speaker drive circuitry are integrated in the active noise cancellation processor.

6. The mouse device of claim 1, further comprising a silent mode switch configured to switch the speaker drive circuitry on and off.

7. A noise cancellation method for a mouse device, the mouse device comprising a button switch, a microcontroller, an audio recording device and a speaker, the button switch configured to produce a first sound when being actuated, the noise cancellation method comprising:
    instructing the audio recording device to record the first sound as a first audio signal in response to the microcontroller receiving an actuation signal from the button switch;
    computing a second audio signal based on the first audio signal; and
    instructing the speaker to play a second sound based on the second audio signal when the button switch is actuated, the second sound substantially cancelling out the first sound.

8. The noise cancellation method of claim 7, wherein the computing a second audio signal based on the first audio signal comprises:
   instructing an active noise cancellation processor of the mouse device to compute the second audio signal based on the first audio signal, wherein the second audio signal is associated with the second sound.

\* \* \* \* \*